US009035918B2

(12) United States Patent
Harris et al.

(10) Patent No.: US 9,035,918 B2
(45) Date of Patent: May 19, 2015

(54) TOUCH SENSITIVE DEVICE EMPLOYING BENDING WAVE VIBRATION SENSORS THAT DETECT TOUCH LOCATION AND PROVIDE HAPTIC FEEDBACK

(75) Inventors: Neil John Harris, Cambourne (GB); Martin Colloms, Cambourne (GB)

(73) Assignee: New Transducers Limited, Cambridgeshire (GB)

( * ) Notice: Subject to any disclaimer, the term of this patent is extended or adjusted under 35 U.S.C. 154(b) by 301 days.

(21) Appl. No.: 13/503,589

(22) PCT Filed: Oct. 29, 2010

(86) PCT No.: PCT/GB2010/051814
§ 371 (c)(1),
(2), (4) Date: May 31, 2012

(87) PCT Pub. No.: WO2011/051722
PCT Pub. Date: May 5, 2011

(65) Prior Publication Data
US 2012/0229407 A1    Sep. 13, 2012

(30) Foreign Application Priority Data

Oct. 29, 2009  (GB) .................................. 0918953.1
Dec. 24, 2009  (GB) .................................. 0922542.6

(51) Int. Cl.
*G06F 3/043*    (2006.01)
*G06F 3/01*    (2006.01)

(52) U.S. Cl.
CPC .............. *G06F 3/0433* (2013.01); *G06F 3/016* (2013.01)

(58) Field of Classification Search
CPC ............ G06F 3/01; G06F 3/016; G06F 3/041; G06F 3/0412; G06F 3/0414; G06F 3/043; G06F 3/0433; G06F 3/0436
USPC .......... 178/18.01, 18.04, 19.02; 345/173, 177
See application file for complete search history.

(56) References Cited

U.S. PATENT DOCUMENTS

| 2005/0146511 A1 | 7/2005 | Hill et al. | |
| 2006/0132464 A1* | 6/2006 | Sullivan | 345/173 |
| 2007/0132743 A1* | 6/2007 | Bayramoglu | 345/177 |
| 2008/0062122 A1 | 3/2008 | Rosenberg et al. | |
| 2010/0079264 A1* | 4/2010 | Hoellwarth | 340/407.2 |

FOREIGN PATENT DOCUMENTS

| GB | 2313195 | 11/1997 |
| WO | 2006042309 | 4/2006 |

* cited by examiner

*Primary Examiner* — Nathan Danielsen
(74) *Attorney, Agent, or Firm* — Alan I. Cantor; Roylance, Abrams, Berdo & Goodman, L.L.P.

(57) ABSTRACT

A touch sensitive device comprising a touch sensitive display member capable of supporting bending wave vibration and having a user accessible display surface, an array of transducers coupled to the display member with the array of transducers comprising at least some transducers which are configured to both detect physical touching of the input surface by the user and to input impulses into the display member to produce a haptics sensation to the user in response to said detected touching of the display surface, and a signal processor to receive signals from at least some of transducers in the array of transducers and adapted to analyze the signals to determine the location of the physical touch on the display surface.

7 Claims, 8 Drawing Sheets

TOUCH SENSITIVE DEVICE EMPLOYING BENDING WAVE VIBRATION SENSORS THAT DETECT TOUCH LOCATION AND PROVIDE HAPTIC FEEDBACK

TECHNICAL FIELD

The invention relates to touch sensitive devices including touch sensitive screens or panels.

BACKGROUND ART

U.S. Pat. Nos. 4,885,565, 5,638,060, 5,977,867, US2002/0075135 describe touch-operated apparatus having tactile feedback for a user when touched. In U.S. Pat. No. 4,885,565 an actuator is provided for imparting motion to the CRT when the actuator is energised to provide tactile feedback. In U.S. Pat. No. 5,638,060, a voltage is applied to a piezo-electric element which forms a switch to vibrate the element to apply a reaction force to a user's finger. In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch. US2002/0075135 describes the use of a second transducer to provide a pulse in the form of transient spike to simulate a button click.

In each of the prior art documents described above, tactile feedback is provided in response to a discrete touch, of a user's finger or pointer.

DISCLOSURE OF INVENTION

According to a first aspect of the invention, there is provided a touch sensitive device comprising a touch sensitive display member capable of supporting bending wave vibration and having a user accessible display surface,
 an array of transducers coupled to the display member with the array of transducers comprising at least some transducers which are configured to both detect physical touching of the input surface by the user and to input impulses into the display member to produce a haptics sensation to the user in response to said detected touching of the display surface, and
 a signal processor to receive signals from at least some of transducers in the array of transducers and adapted to analyse the signals to determine the location of the physical touch on the display surface.

At least some of the transducers in the array of transducers are thus reversible and are configured to both detect said physical touching and input said impulses. In other words, at least some of the transducers in the array of transducers to detect physical touching are common with at least some of the transducers in the array of transducers to input impulses.

The signal processor may comprise a neural network adapted to analyse the signals to provide high level user input.

The array of transducers may be configured to input impulses which localise the haptics sensation to the detected touch location. At least some of the array of transducers may be adapted to detect any of the group consisting of input surface deflection, input surface velocity, applied pressure, applied force, applied angle of touch, and the duration of any touch.

The signal processor may be configured to process the received signals to measure a transfer function of the input signal at each of the plurality of transducers, to infer an inverse transfer function from each measured transfer function and to generate output signals using the appropriate inverse transfer function to determine the touch location. A transfer function measures the transfer of force applied at the test position to each transducer.

The display member may comprise an electronic display screen.

According to another aspect of the invention, there is provided a method of operating a touch sensitive device comprising
 a touch sensitive display member capable of supporting bending wave vibration and having a user accessible display surface, an array of transducers coupled to the display member and a signal processor, comprising
 configuring the array of transducers to comprise at least some transducers which are configured to both detect physical touching of the input surface by the user and to input impulses into the display member to produce a haptics sensation to the user in response to said detected touching of the display surface, and
 arranging the signal processor to receive signals from at least some of transducers in the array of transducers and adapting the signal processor to analyse the signals to determine the location of the physical touch on the display surface.

The signal processor may be configured to have a neural network and may analyse the signals by means of the neural network to provide high level user input.

The array of transducers may be configured to input impulses which localise the haptics sensation to the detected touch location. At least some of the array of transducers may be adapted to detect any of the group consisting of input surface deflection, input surface velocity, applied pressure, applied force, applied angle of touch, and the duration of any touch.

The signal processor may be configured to process the received signals to measure a transfer function of the input signal at each of the plurality of transducers, to infer an inverse transfer function from each measured transfer function and to generate output signals using the appropriate inverse transfer function to determine the touch location. The display member may be arranged to comprise an electronic display screen.

The processing may further comprise inferring the inverse of the transfer function, i.e. the transfer function necessary to produce a pure impulse at the test position from each transducer. The inferring step may be by direct calculation so that measurement of the transfer function H(f) is followed by inversion to obtain $H^{-1}(f)$. Alternatively, the inferring step may be indirect, e.g. using feedback adaptive filter techniques to implicitly invert H(f). Alternatively, the inferring step may be heuristic, e.g. using parametric equalisation processing, and adjusting the parameters to estimate the inverse transfer function.

Alternatively, the inferring step may be approximated by reversing the measured time responses, which in the frequency domain is equivalent to complex conjugation, thus generating the matched filter response $\overline{H(f)}$ In this case, the result of applying the filter is not a pure impulse, but the autocorrelation function.

The resulting inverse transfer functions may be stored for later use by the device, for example in a transfer function matrix with the inverse transfer function for each of the plurality of transducers stored at an associated coordinate in the matrix. The spatial resolution of the transfer function matrix may be increased by interpolating between the calibration test points.

The output haptic sensation may be a maximum response at a given point, i.e. may be localised at the detected touch location. Thus, the output signals for each transducer may be in-phase with each other, whereby all the displacements generated by the transducers add up to the maximum displacement at the given point. It is noted, that at other points, there may be phase cancellation.

Alternatively, the haptic sensation may be a minimum response at a given point. Thus, the output signals for each transducer may be selected so that the displacements provided at the test position (i.e. so that the appropriate transfer functions) sum to zero. With two transducers, this is achieved by inverting one output signal relative to the other.

The haptic sensation may be a maximum at a first point and a minimum at a second point. Alternatively, the haptic sensation may be a response which is between the minimum or maximum at a given position, for example, where the responses at multiple positions are to be taken into account.

The haptic sensation may provide the sensation of a button click to a user. Alternatively, a complex haptic signal (in terms of produced displacement and/or acceleration) may be generated to provide additional information to the user. The haptic feedback signal may be associated with a user action or gesture etc. Alternatively, or additionally, the haptic signal may be associated with the response of the touch-sensitive surface in terms of display action or reaction.

The output (i.e. carrier wave) signal may be a sine wave at a single frequency. Alternatively, the carrier wave signal may comprise multiple sine waves covering a range of frequencies or may be a swept (chirp), or may be an FM modulated sine wave or a band-limited noise signal, or the carrier may be modulated by band limited noise.

The touch-sensitive screen may be vibrated by applying a signal comprising multiple pulses or a stream of pulses. The vibration may include any type of vibration, including bending wave vibration, more specifically resonant bending wave vibration. The vibration exciter may comprise means for applying a bending wave vibration to the screen face. The vibration exciter may be electro-mechanical.

The exciter may be an electromagnetic exciter. Such exciters are well known in the art e.g. from WO97/09859, WO98/34320 and WO99/13684, belonging to the applicant and incorporated herein by reference. Alternatively, the exciter may be a piezoelectric transducer, a magneto-strictive exciter or a bender or torsional transducer (e.g. of the type taught in WO 00/13464). The exciter may be a distributed mode actuator, as described in WO01/54450, incorporated herein by reference. A plurality of exciters (perhaps of different types) may be selected to operate in a co-ordinated fashion. The or each exciter may be inertial.

The touch surface may be a panel-form member which is a bending wave device, for example, a resonant bending wave device. The touch screen may also be a loudspeaker wherein a second vibration exciter excites vibration which produces an acoustic output. Alternatively, one of the exciters used to provide haptic feedback may also be used to provide an audio signal to drive the touch screen as a loudspeaker. For example, the touch screen may be a resonant bending wave mode loudspeaker as described in International Patent Application WO97/09842 which is incorporated by reference.

The touch sensitive device may incorporate a microphone which may be fixed at a suitable point on the device. Alternatively, the touch surface may be used as a bending wave diaphragm receiving sound energy, which is reversibly transduced into electrical signals via a suitable vibration sensor connected to the diaphragm. In this way, the touch surface itself forms the microphone. The microphone may exploit bending wave behaviour and analysis, for the vibration control surface, for improved performance. The electrical output from the microphone may be processed to compensate for acoustic artefacts which may be present, resulting in higher accuracy.

Several microphone sensors may be used distributed under the control surface to work in conjunction with further processing including control of directivity. The sensors may be reversible and produce sound energy from the diaphragm control surface. The sensors may also deliver vibration signals which are useful for providing haptic feedback to the user. Alternative existing sensors may be used to provide the microphone function Contact on the surface may be detected and/or tracked as described in International patent applications WO 01/48684, WO 03/005292 and/or WO 04/053781 to the present applicant. These International patent applications are here incorporated by reference. Alternatively, other known methods may be used to receive and record or sense such contacts.

There is also described a touch sensitive device comprising
  a touch sensitive display member capable of supporting bending wave vibration and having a user accessible display surface,
  an array of transducers coupled to the display member with the array of transducers being configured to
    detect physical touching of the input surface by the user, including detecting force resulting from an applied touch, and
    input impulses into the display member to produce a haptics sensation to the user in response to said detected touching of the display surface, and
  a signal processor coupled to receive signals from at least some of transducers in the array of transducers and adapted to analyse the signals to determine the location of the physical touch on the display surface.

The array of transducers may be configured to comprise an array of transducers to detect physical touching of the input surface by the user, including detecting force resulting from an applied touch and an array of transducers to input impulses into the display member to produce a haptics sensation to the user in response to said detected touching of the display surface. Alternatively as set out in the first aspect of the invention, the array of transducers may be configured so that at least some of the transducers in the array of transducers are reversible and are configured to both detect said physical touching and input said impulses.

There is also described a touch sensitive device comprising
  a touch sensitive display member capable of supporting bending wave vibration and having a user accessible display surface,
  an array of transducers coupled to the display member with the array of transducers being configured to
    detect physical touching of the input surface by the user, including detecting force resulting from an applied touch, and
    input impulses into the display member to produce a haptics sensation to the user in response to said detected touching of the display surface, and
  a signal processor coupled to receive signals from the array and adapted to analyse the signals to determine the location of the physical touch on the display surface, the signal processor comprising a neural network to provide high-level user output.

There is also described a method of operating a touch sensitive device comprising
  a touch sensitive display member capable of supporting bending wave vibration and having a user accessible display surface, an array of transducers coupled to the display member with the array of transducers and a signal processor, comprising configuring the array of transducers to detect physical touching of the input surface by the user, including detecting force resulting from an applied touch, and to input impulses into the display member to produce a haptics sensation to the user in response to said detected touching of the display surface, and coupling the signal processor to receive signals from at least some of transducers in the array of transducers and adapting the signal processor to analyse the signals to determine the location of the physical touch on the display surface.

At least some of the transducers in the array of transducers may be arranged to be reversible and configuring the at least some of the transducers to both detect said physical touching and to input said impulses.

There is also provided a method of operating a touch sensitive device comprising a touch sensitive display member capable of supporting bending wave vibration and having a user accessible display surface, an array of transducers coupled to the display member and a signal processor, comprising arranging the array of transducers to detect physical touching of the input surface by the user, including detecting force resulting from an applied touch, and to input impulses into the display member to produce a haptics sensation to the user in response to said detected touching of the display surface, coupling the signal processor to receive signals from the array, adapting the signal processor to analyse the signals to determine the location of the physical touch on the display surface, and configuring the signal processor to comprise a neural network to provide high-level user output.

Each of these described methods and touch sensitive devices may be used in conjunction with features of the aspects of the invention described above.

The invention further provides processor control code to implement the above-described methods, in particular on a data carrier such as a disk, CD- or DVD-ROM, programmed memory such as read-only memory (firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very High speed integrated circuit Hardware Description Language). As the skilled person will appreciate such code and/or data may be distributed between a plurality of coupled components in communication with one another.

BRIEF DESCRIPTION OF DRAWINGS

The invention is diagrammatically illustrated, by way of example, in the accompanying drawings in which:

FIG. 1b is a schematic block diagram of the components of the device of FIG. 1a;

FIG. 1c is a schematic block diagram of the alternative arrangement of the components of the device of FIG. 1a;

DETAILED DESCRIPTION OF DRAWINGS

Figure 1A:
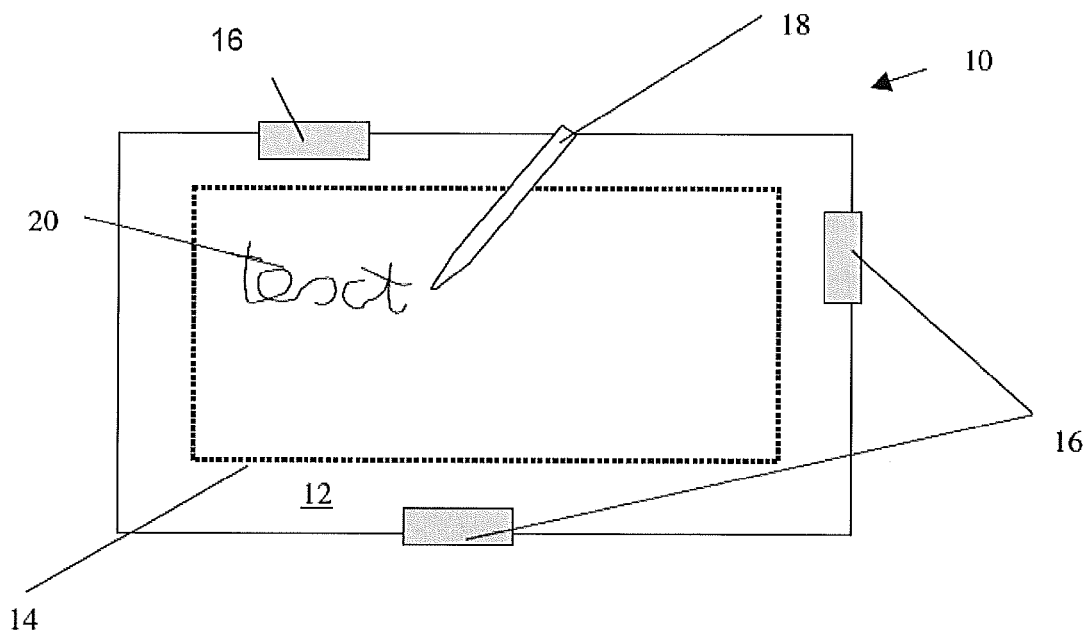
FIG. 1a is a schematic illustration of a touch sensitive device.

FIG. 1a shows a touch sensitive device 10 comprising a touch sensitive screen 12 on which a stylus 18 or pencil or similar writing instrument is being used to write text 20. Alternatively, the screen may be contacted by a user's finger(s) (not shown). Such contact by a user's finger(s) may include a simple tap or more complex gestures such as sliding, pinching or rotating fingers on the screen. There is an array of transducers 16 coupled to the screen with the array being configured to detect physical touching on the screen and to input impulses into the screen to provide a haptics feedback.

Figure 1B:
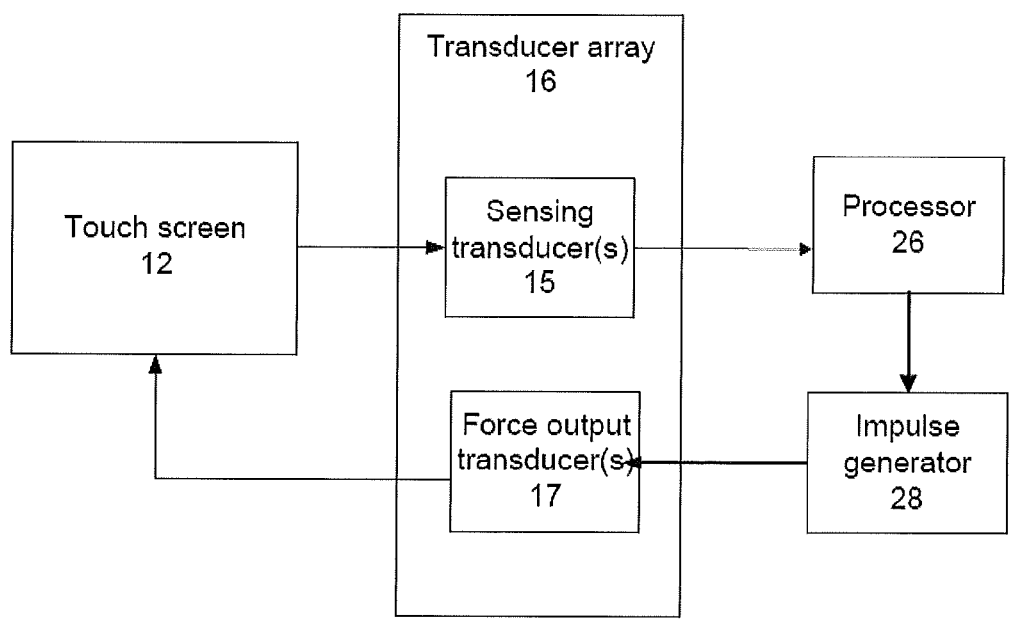

As shown in FIG. 1b, the array may be configured so as to comprise one or more sensing transducers 15 for detecting physical touching and one or more force output transducers 17 to input impulses. The touch sensitive screen 12 is connected to the or each sensing transducer 15 which detects the nature of the contact on the screen. The or each sensing transducer is connected to a processor 26 which receives and processes the signals from the or each sensing transducers. The processor 26 determines the location of the physical touch on the screen. The processor then instructs the impulse generator 28 to generate a signal which drives the or each force output transducer 17 to energise the panel to provide the haptics sensation.

Figure 1C:
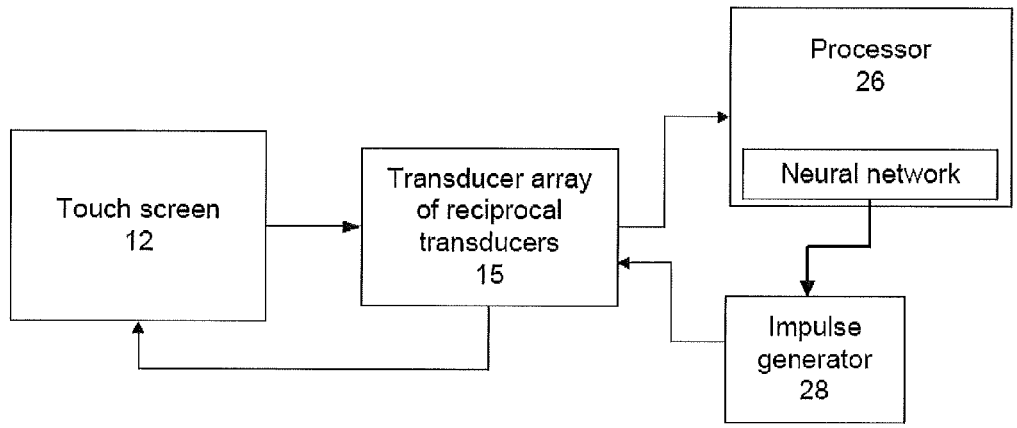

Alternatively, as shown in FIG. 1c the array may comprise reciprocal transducers which perform both the sensing and force output function. In this arrangement, the array is connected to the processor 26 whereby the processor receives signals from the array and to the impulse generator 28 whereby the array input impulses into the screen. As it will be appreciated, a combination of the embodiments of FIGS. 1b and 1c is envisaged with some or all of the array of transducers being reciprocal (or reversible).

In each of the above embodiments, the sensing transducers may be used to sense vibrational energy, particularly bending wave energy. The low frequency components of such vibrational energy may be measured and processed to determine the touch location. Such low frequency vibrations include the whole-body movements (i.e. pistonic type movements where the screen is moving as one body) and some low-order bending wave modes. The high frequency components of such vibrational energy are not useful for accurately triangulating the touch location, due to dispersion (i.e. the speed of the vibration being dependent on frequency). However, such high frequency components may be useful for determining different information about the touch (not just location). Such information may include higher-level user inputs such as gestures. By using the different parts of the frequency spectrum to derive different information about the touch, the burden on the processor (i.e. its application software) may be reduced.

Figure 2:
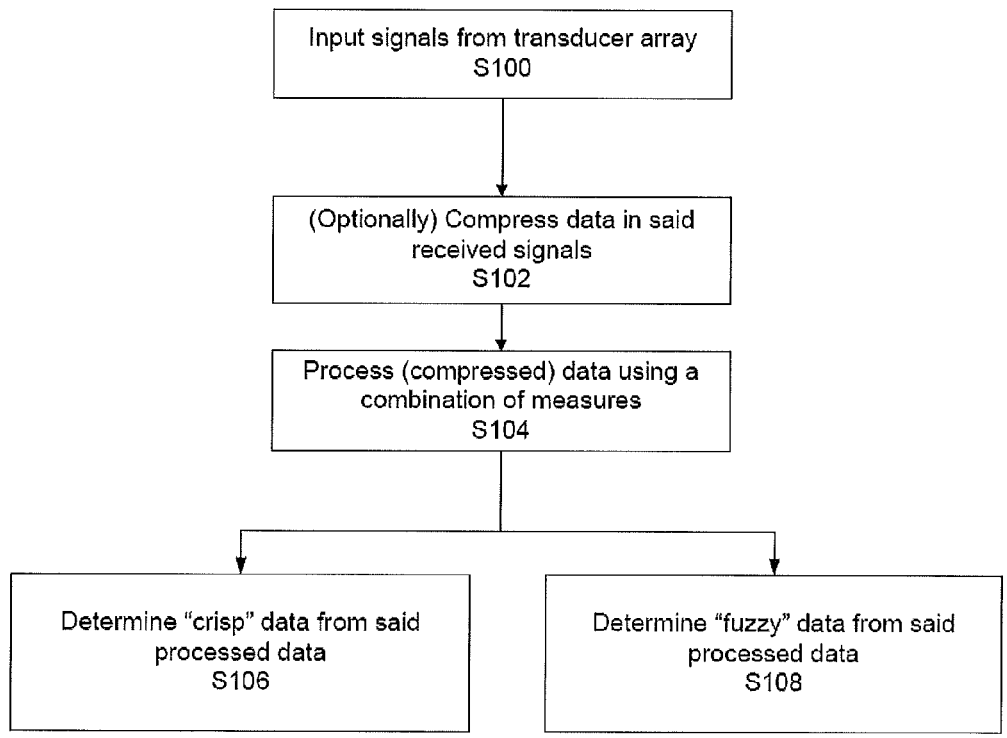
FIG. 2 is a flowchart showing the processing in the processor for FIG. 1b or 1c.

FIG. 2 shows how the signals received by the processor may be processed. The signals are input from the transducer array (S100) and some initial processing of the signals may be optionally be undertaken (S102). This optional processing may extract information such as amplitude, model spectrum, zero crossing times and may be used to compress the received data. The (optionally) compressed data is then processed using a combination of measures (S104). Such measures may include standard engineering measures to extract level and frequency and more perceptual measures such as a neural network.

The measures are used to determine and output two types of data—crisp and fuzzy (S106 and S108) which report features of the touch event to interested applications. Such crisp data returns precise values. In contrast, the fuzzy data returns values without precise numerical values and is fuzzy in the sense of fuzzy logic which uses truth degrees as a mathematical model of the vagueness phenomenon. Thus crisp data could include the force of a press, i.e. 0.65N and its precise location of (128, 96) pixels. In contrast, fuzzy data would characterise the press as soft, medium or hard and in the "upper left quadrant".

The crisp data could include touch force, estimated location, velocity of movement of the touch, displacement of the screen, duration of the touch, applied angle of touch, estimated vector and whether or not the touch was a double click. Fuzzy data could include probability data sets for sets such as "soft press" or "hard press" or "gentle press" or "aggressive press" rather than determining the exact force applied. This could be extended to cover higher-level multi-touch outputs, e.g. "fingers opening", "fingers closing" or "fingers rotating".

The crisp and fuzzy data could be used to support the precise information available from a conventional touch-sensitive device, e.g. devices described in International patent applications WO 01/48684, WO 03/005292 and/or WO 04/053781.

The fuzzy data outputs could be used to write fuzzy logic statements to control the operation of the device. This may provide a data rich interface to the user to allow for a closer relationship, higher quality of feedback of action and result. Thus a user may be able to have more accurate control of required electronic controls in the device and an overall more powerful experience. An example statement is:

```
If "fingers opening"
{
    If "slowly"
        do slow_opening_function
    else
        do fast_opening_function
}
else
    do closing_function
```

In a conventional system, the code would be more complicated, for example:

```
delta_v = (delta_touch_1_position − delta_touch_2_position)/
time_period
if (delta_v>low_threshold)
{
    if (abs(delta_v<mid_threshold)
        do slow_opening_function
    else
        do fast_opening_function
}
else
    do closing_function
```

A neural network fits well with the idea of fuzzy outputs and may be incorporated in the processor, e.g. as shown in FIG. 1*c* (but may also be included in FIG. 1*b*). A neural network avoids the need for complicated analysis of the waveforms of the vibrational energy. However, the neural network will need to be trained by a user inputting a prescribed sequence of training actions (e.g. slow press, fast left to right draw, hard tap, double click). These training actions allow the neural network to learn to recognise these actions. The training should ideally be done on each device (e.g. on the representative hardware) but it may be sufficient to calibrate a small sample of the devices and transfer the learning data to all devices.

The advantages of the proposed system include simplified software, e.g. by dividing the frequency range as discussed. The use of reciprocal transducers in the system also re-uses the haptics hardware to allow some touch sensing without a separate or other touch sensor. This may reduce the size of the device because of the reuse of the existing infrastructure.

A look-ahead function may also be included for textures and gestures, especially where system latency is an issue. This look-ahead function may alert the processor to analyse the (x,y) stream for particular events. Hence the processor has more time to provide a more accurate estimate to the signal generator for the force-output transducer without worrying about latency.

Pilot Study Test Bed Using FEA

Figure 3:
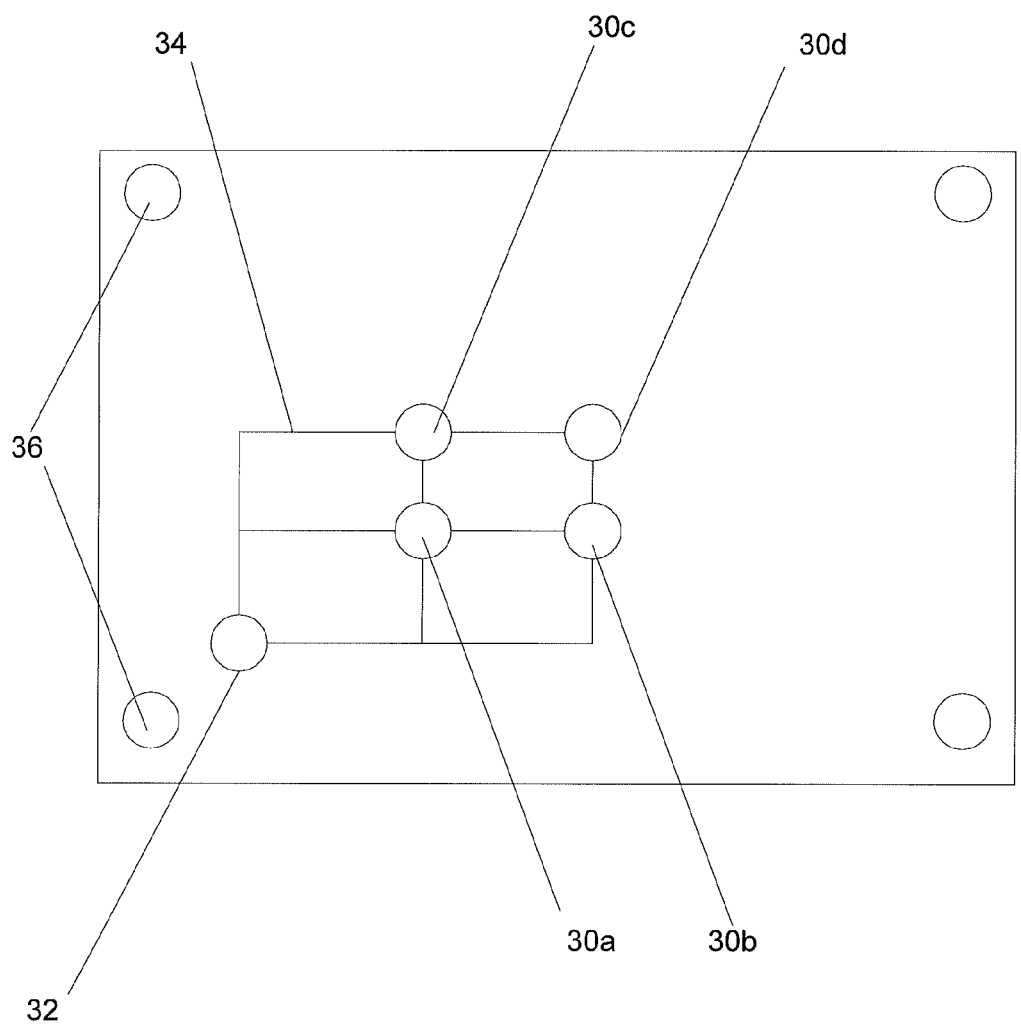
FIG. 3 is a schematic of FE model, showing exciters and test grid.

An FE model of a hand-held device with an 8.9" diagonal panel was developed. The model is a simplification of similar real objects, with bi-lateral symmetry. Four exciters 36 are mounted to the panel, one at each corner. The model, which includes a 20 mm grid 34 of possible touch locations, is shown in FIG. 3. The grid 34 is numbered in (x, y), from (−1, −1) at the bottom left to (1, 1) at the top right (x running from left to right). Five touch positions are shown in the grid. A first position 30*a* is at (0,0), a second 30*b* at (0,1), a third 30*c* at (1,0), a fourth at (1,1) and the final position 32 at (−1,−1).

Touching any of the target locations causes electrical signals to be generated in the exciters. As explained below and illustrated in FIG. 11, these signals are processed and "data reduced" by wavelet transformations to give the signatures.

Figure 11:
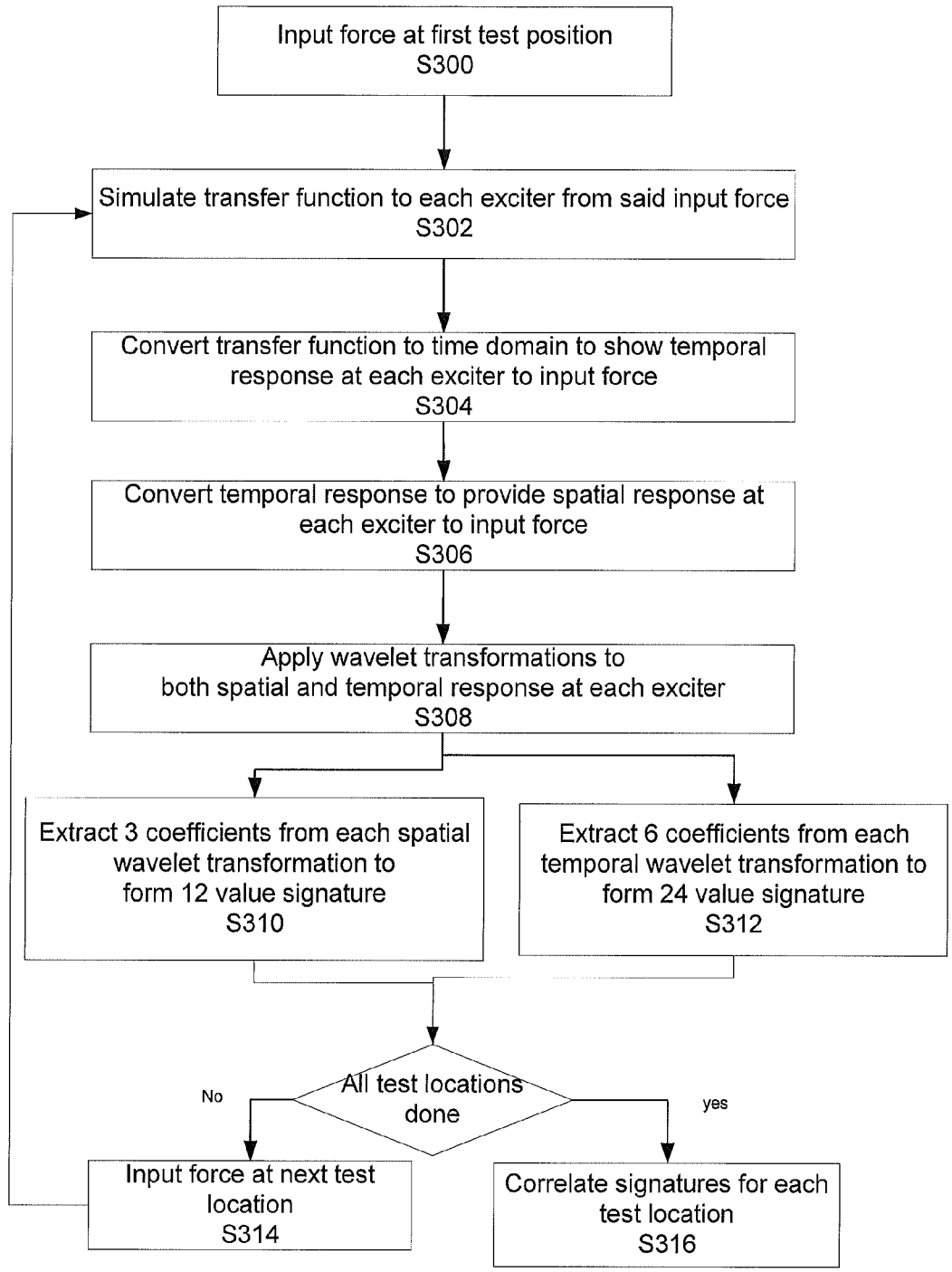
FIG. 11 is a flowchart of an alternative processing in the processor of FIG. 1b or 1c.

Referring to FIG. 11, at step S300, unit forces of 1 N were applied in directions X, Y and Z, at (0,0) and the corresponding transfer functions to each of the four exciters 36 were simulated. The responses due to normal (Z) excitation were considerably (20-30 dB) stronger than those due to tangential (X, Y) excitation, hence any signal received will be dominated by the response proportional to the normal force.

Figure 4:
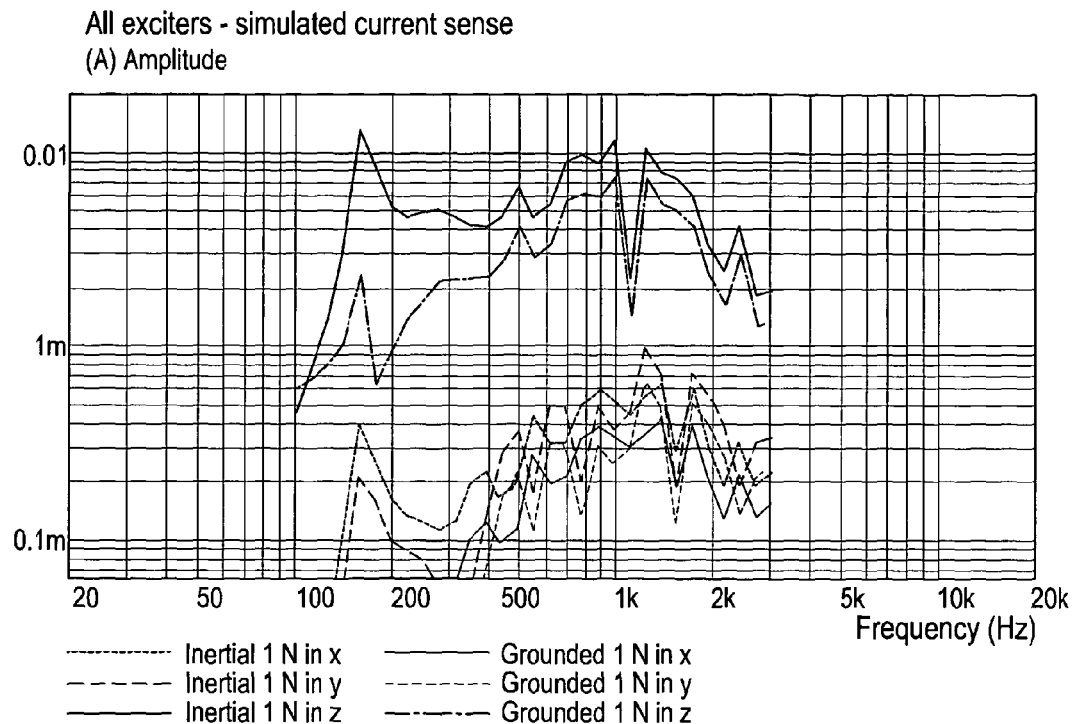
FIG. 4 shows simulated responses for inertial and grounded exciters.

FIG. 4 shows typical transfer functions to the four exciters (step S302). As will be seen from the graphs, there is a benefit from using inertial exciters at lower frequencies (ignore the level difference at higher frequencies, as this was introduced to separate artificially the traces).

Signal Analysis

Figure 5:
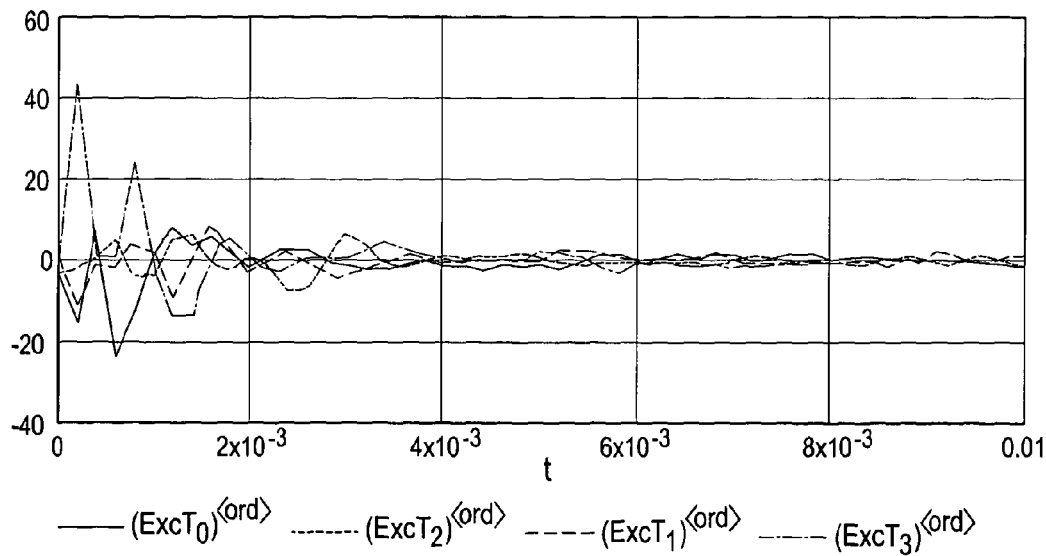
FIG. 5 is a temporal response for all 4 exciters to 1N in Z at (0,0)

Analysis of frequency-domain signals showed differences between sets of traces, but nothing simple to act as a signature. FIG. 5 shows the temporal response for each of the first four exciters to 1N applied at (0,0) perpendicular to the panel. Conversion to the time domain (Step S304)—which would be the domain in which the signals would be collected in real life—does not instantly reveal anything, but we know that there should be transit-time differences embedded in them somewhere.

Figure 6:
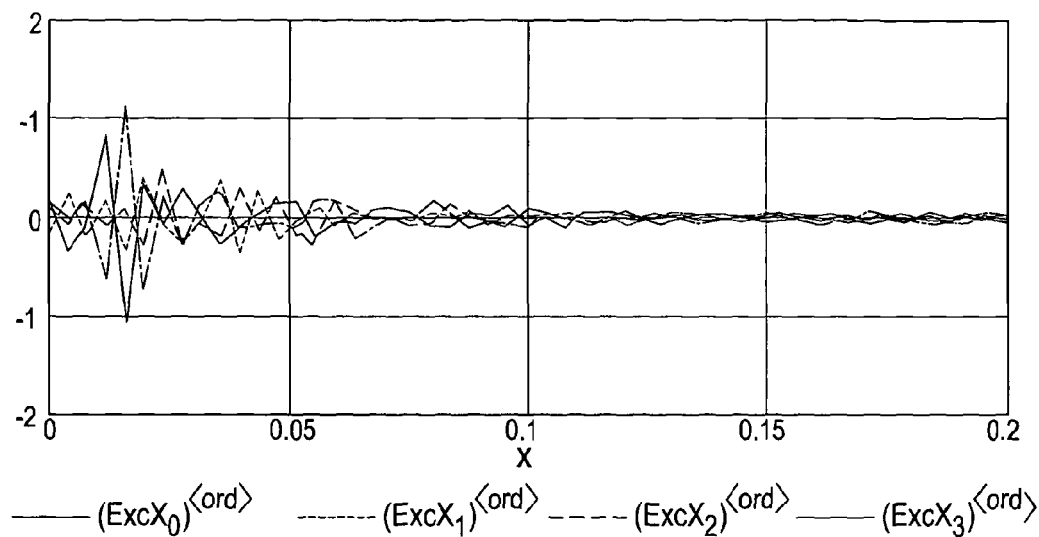
FIG. 6 is a spatial response for all 4 exciters to 1N in Z at (0,0)

To remove the effects of dispersion, a k-space to x-space Fourier transform was used to provide the spatial responses for each of the first four exciters to 1N applied at (0,0) perpendicular to the panel (step S306). The result is not particularly illuminating at this stage as shown in FIG. 6.

Figure 7:
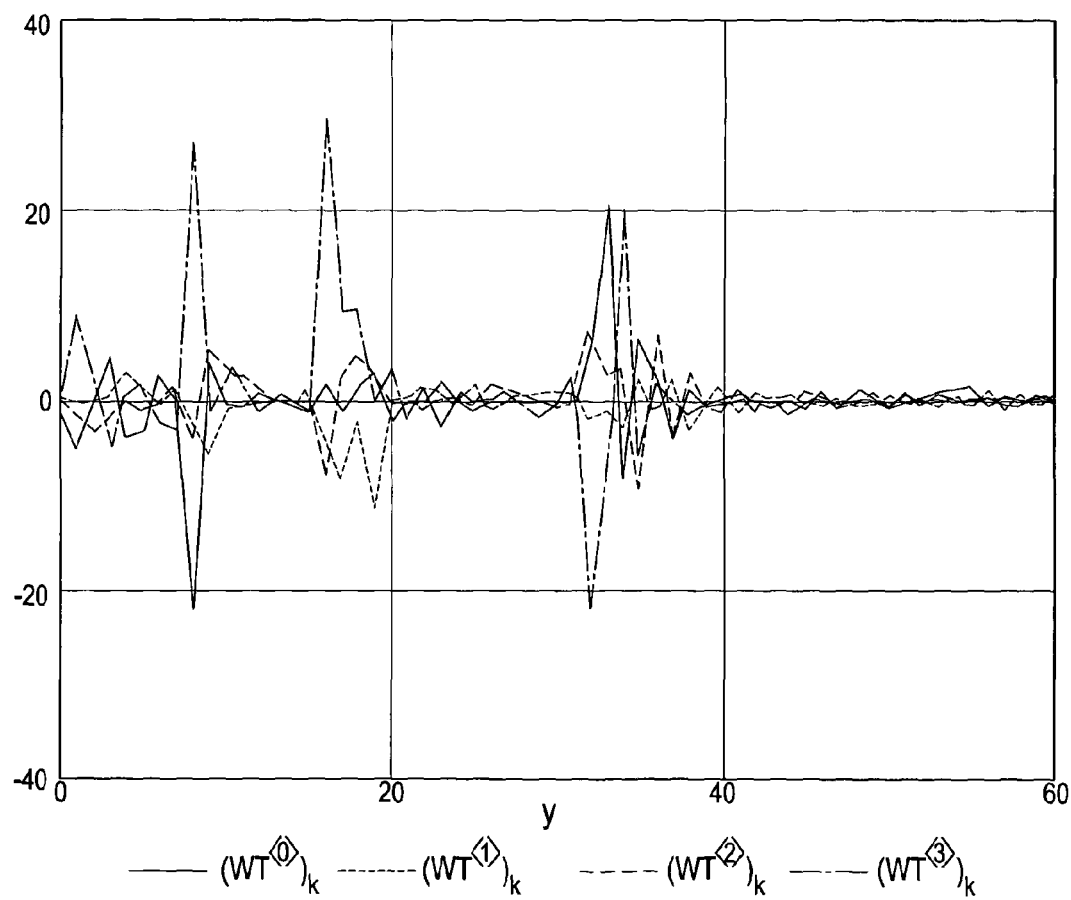
FIG. 7 shows wavelet transforms of the temporal responses of FIG. 5.
Figure 8:
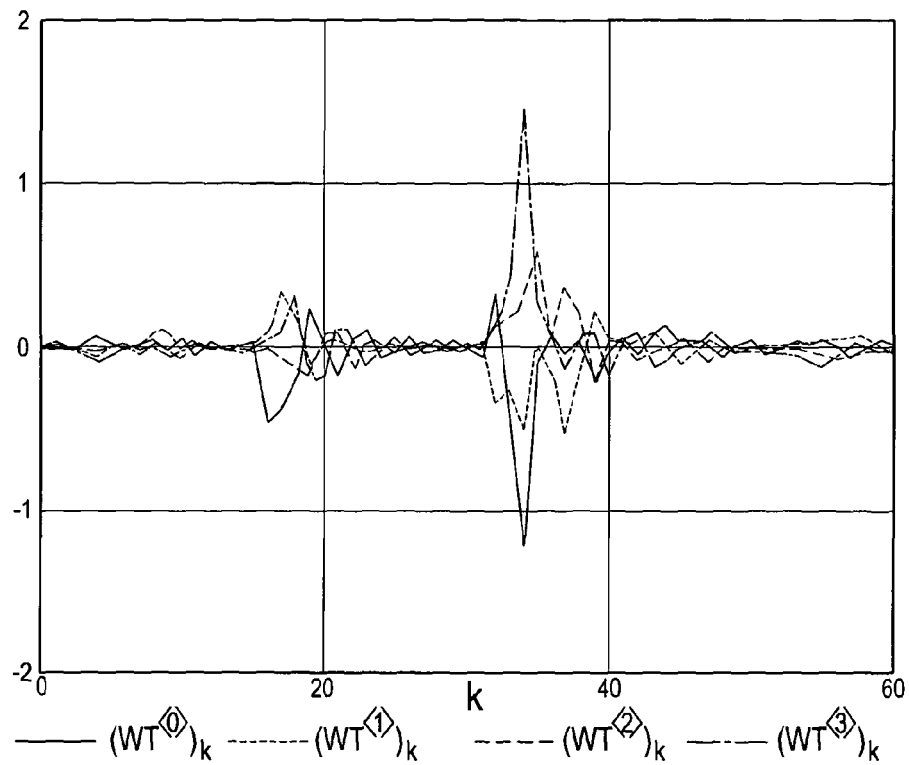
FIG. 8 shows wavelet transforms of spatial responses of FIG. 6.

The differences between the time-domain (FIG. 5) and space-domain (FIG. 6) representations are revealed when they are passed through a wavelet transform (Step S308). A wavelet transformation is a known mathematical technique which can employ any number of different "basis functions". The set used in the example were the well known "Daubechies wavelet". Loosely speaking wavelet transformations different from Fourier transformations in that they code not only frequency but also time. Wavelets isolate both positional and rate information simultaneously, in contrast to the Fourier system which only isolates one at a time. If we compare FIG. 7 which shows the wavelet transformations of the temporal responses of FIG. 5 with FIG. 8 which shows the wavelet transformations of the spatial responses of FIG. 6, it is seen that the while the data is confined to relatively few coefficients in each case, the confinement is much stronger for the latter. Thus the wavelet transformations identify where in the signal the fluctuation occurred.

On examination of the wavelet transformations for the spatial responses, it is found that only 3 coefficients for each signal are needed to contain most of the data, and this set of 12 values can form a signature (Step S310).

Signature Testing

Signatures were collected for each of the four test locations (0,0), (0,1), (1,0) and (1,1) (Step 314 and looping through previous steps). The signatures are correlated with each other to show how strong a separation could be achieved (Step S316). An additional test point 32, (−1, −1), was also used to check that there was no match to any of the other four.

TABLE 1

Cross correlation values for 12-value signatures of spatial signal

|  | Signature (0, 0) | Signature (0, 1) | Signature (1, 0) | Signature (1, 1) |
|---|---|---|---|---|
| Data (0, 0) | 1 | 0.125 | 0.117 | 0.044 |
| Data (0, 1) | 0.125 | 1 | −0.017 | −0.063 |
| Data (1, 0) | 0.117 | −0.017 | 1 | 0.486 |
| Data (1, 1) | 0.044 | −0.063 | 0.486 | 1 |
| Data (−1, −1) | −0.333 | −0.624 | 0.009 | 0.273 |

As shown in the table below, the process works on time-domain data, but not as well. With the data being more spread out, it was found that roughly twice as many values were needed to get reliable results (Step S312).

TABLE 2

Cross correlation values for 24-value signatures of temporal signal

|  | Signature (0, 0) | Signature (0, 1) | Signature (1, 0) | Signature (1, 1) |
|---|---|---|---|---|
| Data (0, 0) | 1 | −0.346 | −0.039 | 0.032 |
| Data (0, 1) | −0.346 | 1 | 0.244 | −0.593 |
| Data (1, 0) | −0.039 | 0.244 | 1 | −0.426 |
| Data (1, 1) | 0.032 | −0.593 | −0.426 | 1 |
| Data (−1, −1) | −0.321 | 0.143 | 0.248 | 0.001 |

Simplification of the Processing

Figure 12:
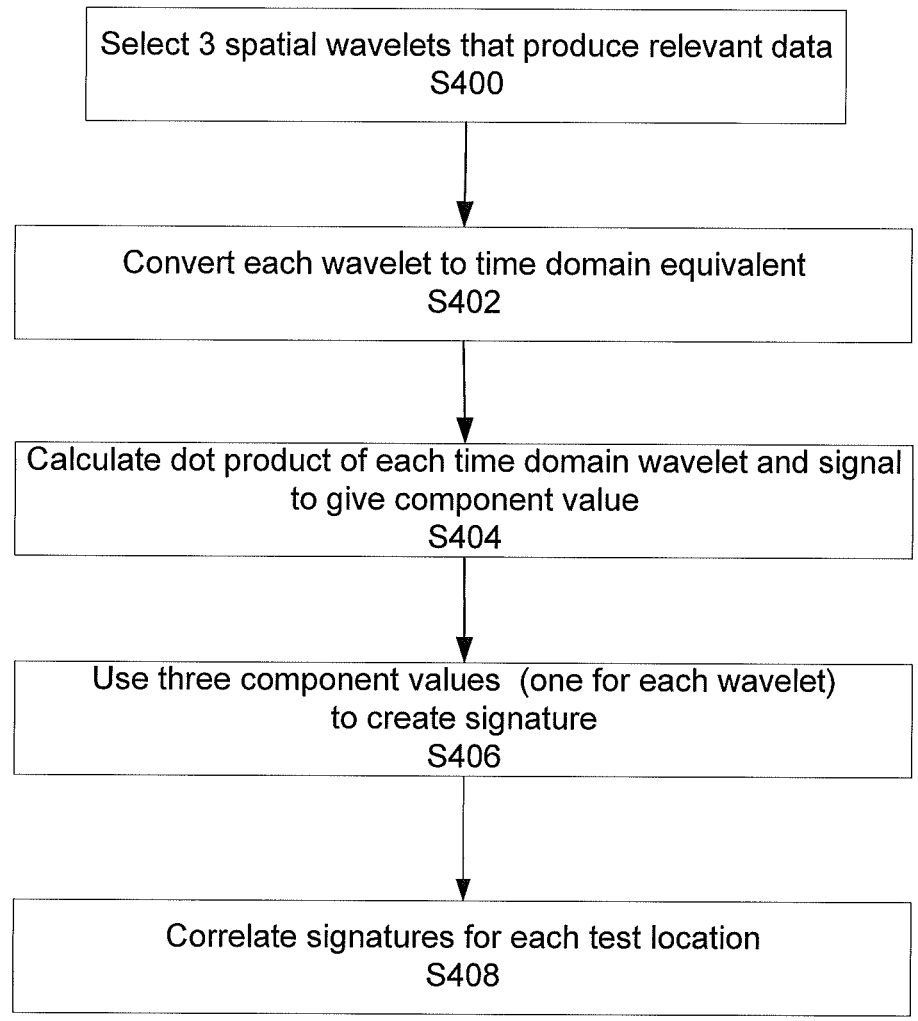
FIG. 12 is a flowchart showing the simplified methodology of FIG. 11.

It would seem to be excessive that for just 3 data values, we require 2 Fourier transforms and a wavelet transform. Is there a simplification? The simplified method is illustrated in FIG. 12. The relevant data has been collected in step S310/S312 in FIG. 11.

Figure 9:
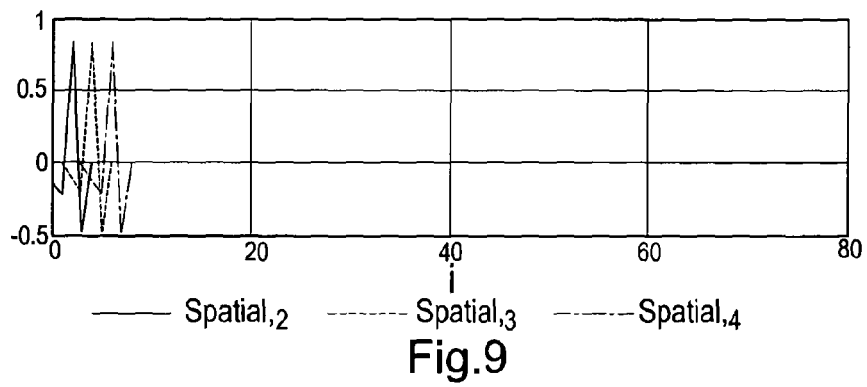
FIG. 9 shows inverse wavelet transforms of the three relevant bins.
Figure 10:
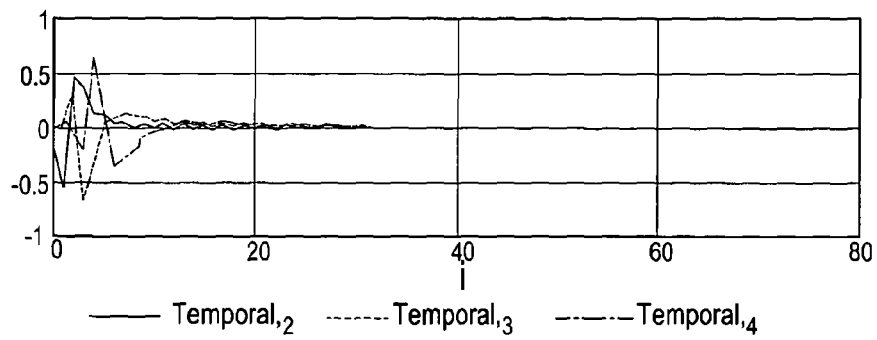
FIG. 10 shows temporal (dispersed) versions of the wavelets.

Let us work backwards from the 3 wavelets that produce relevant data (Step S400). Each wavelet has just 4, non-zero values, and each is just a shifted version of the others (FIG. 9). These wavelets are spatial in our application. They are mutually orthogonal (the dot-product of W[i] and W[j] is 1 if i=j and 0 otherwise). Using the Fourier transform technique, we can convert the waveforms to their time-domain equivalents (Step S402) (FIG. 10). These are no longer orthogonal, but we will use them anyway. The component value for each wavelet is obtained by taking the dot product of the wavelet and the signal (S404). Using this method, we again obtain just 3 values for each channel, but without any (real-time) transforms and thus we can create a 12 value signature (S406). The steps can be repeated for each test location and the signatures correlated as before (S408).

TABLE 3

Cross correlation values for new 12-value signatures of temporal signal

|  | Signature (0, 0) | Signature (0, 1) | Signature (1, 0) | Signature (1, 1) |
|---|---|---|---|---|
| Data (0, 0) | 1 | −0.391 | 0.146 | 0.011 |
| Data (0, 1) | −0.391 | 1 | 0.024 | −0.351 |
| Data (1, 0) | 0.146 | 0.024 | 1 | 0.142 |
| Data (1, 1) | 0.011 | −0.351 | 0.142 | 1 |
| Data (−1, −1) | −0.308 | 0.287 | 0.495 | 0.197 |

Conclusions

We looked at the feasibility of using signals detected by a set of exciters on a Surface-Sound, SoundVu or Touch-Sound system to detect positional information. A combination of dispersion correction and wavelet transform reduces the amount of data necessary for generating a characteristic signature to a bare minimum. The increased efficiency of the combined data analysis allows the processor size to be reduced and/or the processor computation rate to be increased. The data reduction is so dramatic, that it is not necessary to complete each step separately. It is not yet known how robust the system is. It would appear to work very well with clean, distinct taps (like the APR based systems), but whether it would work with real-time data is as yet unknown.

These processes are linear, and so preserve X, Y and Z information. Feeding the 12-value signatures into a neural network, for example, would allow instantaneous positional and force information to estimated. By additionally feeding historical information into the network, estimates of rates of change may be made. The signatures could then be used along with "self calibration" to train a system to recognise not only X,Y locations, but also higher level constructs such as touch/tap separation or gestures.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of operating a touch sensitive device comprising a touch sensitive display member capable of supporting bending wave vibration and having a user accessible display surface, an array of transducers coupled to the touch sensitive display member, and a signal processor, the method comprising:
   detecting physical touching of the user accessible display surface by a user using at least some of the tranducers in the array of transducers;
   inputting impulses into the touch sensitive display member via the at least some of the tranducers in the array of transducers to produce a haptics sensation to the user in response to said detecting physical touching of the user accessible display surface; and
   analysing signals received by the signal processor from the array of transducers to determine the location of the physical touch on the user accessible display surface using a combination of dispersion correction and wavelet transform.

2. The method according to claim 1, comprising processing the detected signals to preserve XYZ information.

3. The method according to claim 2, comprising extracting data to identify gestures such as sweep and pinch made on the touch plane.

4. The method according to claim 3, comprising feeding resulting twelve-value signature into a neural network to allow instantaneous positional and force information to be estimated.

5. The method according to claim 4, comprising feeding historical information into the neural network to permit estimation of the rates of change.

6. The method according to claim 4, comprising processing resulting signatures together with self-calibration to train the touch sensitive device to recognize higher level constructs such as touch/tap separation and gestures.

7. The method according to claim 2, comprising processing data to discard higher order terms in the computation of the combination of wavelet and dispersion corrected sensed components.

\* \* \* \* \*